Dec. 16, 1930.  E. R. ANDERSON  1,784,998
FRUIT PITTER
Filed Feb. 6, 1926  2 Sheets-Sheet 1
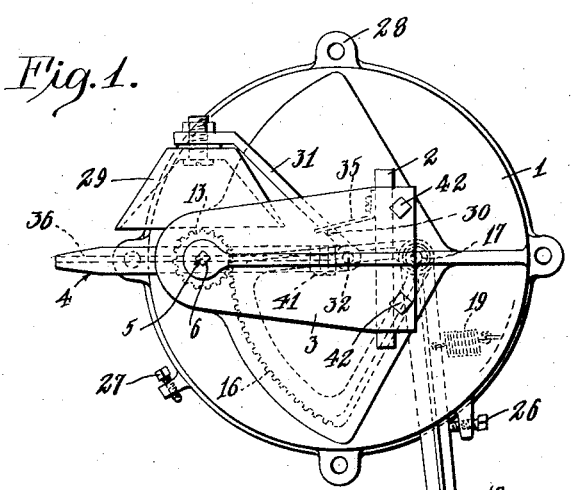
Fig. 1.
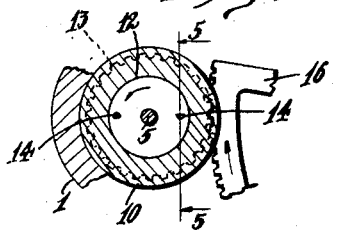
Fig. 4.
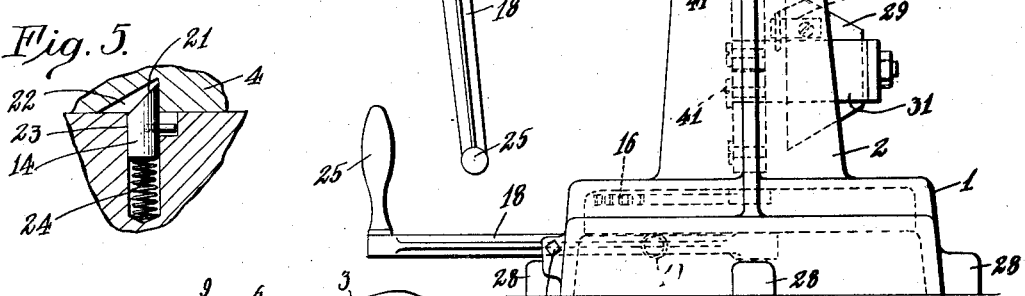
Fig. 3.
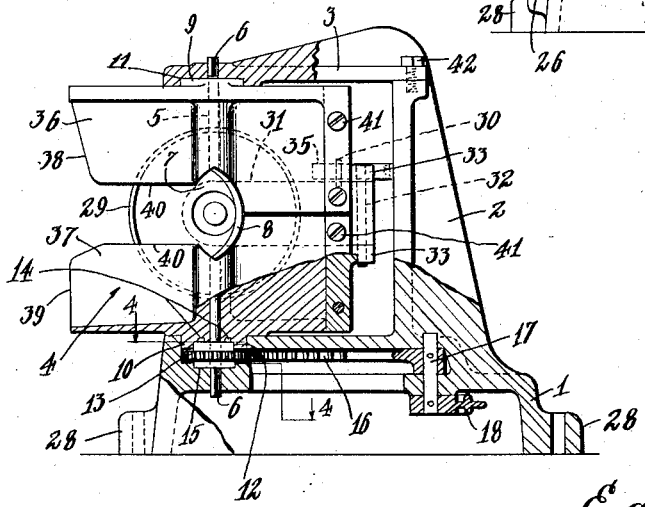
Fig. 5.
Fig. 2.
Inventor
Earl R. Anderson
By Lyon & Lyon
Attorneys

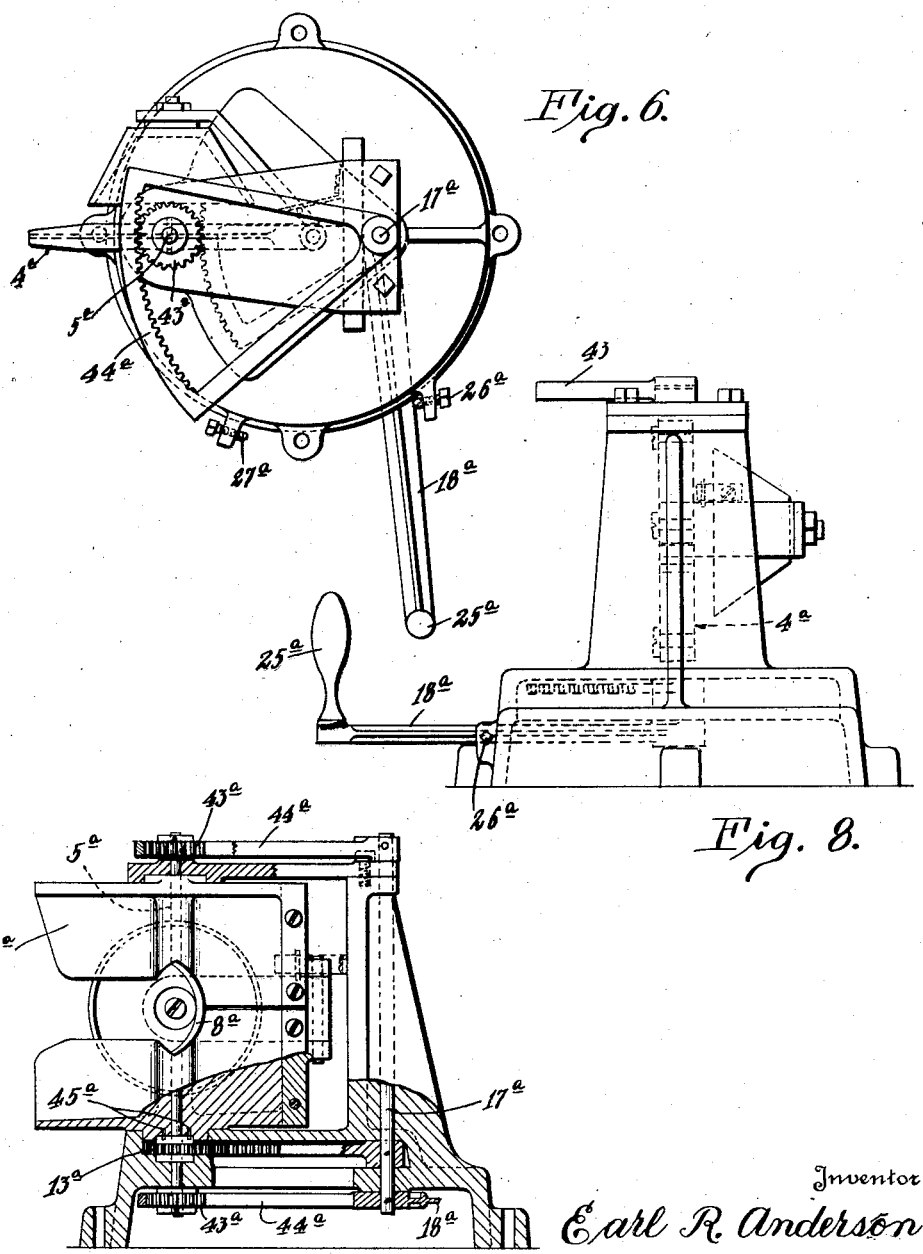

Patented Dec. 16, 1930

1,784,998

UNITED STATES PATENT OFFICE

EARL R. ANDERSON, OF LOS ANGELES, CALIFORNIA, ASSIGNOR, BY MESNE ASSIGN-MENTS, TO PACIFIC MACHINERY COMPANY, OF SAN FRANCISCO, CALIFORNIA, A CORPORATION OF CALIFORNIA

FRUIT PITTER

Application filed February 6, 1926, Serial No. 86,423. Renewed March 14, 1930.

This invention relates to a fruit pitter and more particularly to an apparatus for removing pits or stones from fruit, particularly clingstone peaches.

In the copending application of Albert R. Thompson for fruit pitter, Serial No. 62,377, Filed October 14, 1925, there is described and claimed a fruit pitting unit or device providing a bifurcated blade upon which fruit may be impaled with the intact pits positioned in the aperture formed in the blade so as to engage a revolvable curved pitting knife mounted in the blade. My present invention is in various aspects somewhat similar thereto but is not necessarily limited to the details of the unit or device illustrated in the aforesaid application and provides an apparatus in which the impaling member is rotated relative to the pitting knife so that the halves of the peach or fruit are caused to rotate relative to the pitting knife so that the fruit is severed from the pit.

A further object of this invention is to provide a fruit pitter in which means are provided for impaling the fruit and for rotating the fruit so impaled relative to a fixed pitting member. Due to the rotation of the peach, the pit is closely severed from the flesh of the fruit to provide a uniform cavity in the halves of the fruit pitted and so as to remove a minimum of flesh of the fruit with the pit.

Another object of this invention is to provide a pitting member which is adapted to be held at each end in fixed position so as to eliminate the tendency of such a pitting member from flexing or deforming during the putting operation.

Another object of this invention is to provide such a fruit pitter having impaling means which comprises bifurcated or slotted impaling blades that must permit the run of a limited sized pit or the pitting operation will not be centered and the pitting irregular and which invention provides a structure in which the units comprising the rotatable impaling blades may be readily interchanged so that the pitting apparatus may be readily accommodated to the size of the pit to be run.

Other objects and advantages of this invention will be apparent from the following detailed description of the preferred embodiment thereof, as illustrated in the accompanying drawings, in which drawings:

Figure 1 is a top plan view of a fruit pitter embodying this invention.

Figure 2 is a side elevation thereof taken partly in section and illustrates the driving means provided for rotating the impaling member.

Figure 3 is a rear elevation thereof.

Figure 4 is a fragmental plan view taken substantially on the line 4—4 of Figure 3.

Figure 5 is a fragmental sectional view illustrating a form of clutch mechanism and taken substantially on the line 5—5 of Figure 4.

Figure 6 is a top plan view of a modified form of fruit pitter embodying this invention.

Figure 7 is a sectional end elevation thereof.

Figure 8 is a rear elevation thereof.

In the preferred embodiment of this invention, illustrated in the accompanying drawings, 1 illustrates a base having a rear upright extension 2, to which a top-plate 3 is secured. A bifurcated fruit impaling member 4 is journaled on a shaft 5, which shaft 5 has square ends 6 which fit into square sockets formed in the base 1 and top-plate 3, respectively. The bifurcated impaling member 4 provides a central pit receiving recess 7 in which a curved pitting knife 8 is mounted. The curved pitting knife 8 provides the connection between the respective ends of the shaft 5 upon which the impaling member 4 is mounted. The square ends 6 of the shaft 6 maintain the curved pitting knife 8 from rotating. Annular flanges 9 and 10 are formed on the opposite sides of the impaling member 4 and fit within annular recesses 11 and 12, formed in the cover-plate 3 and base 1, respectively. The flanges 9 and 10 act as bearing guides for the impaling member 4 during the rotation thereof. Journaled on the shaft 5 and mounted within a recess formed in the base 1 is a pinion gear 13, which pinion gear 13 is secured to the impaling member 4 by any suitable means, such as the pins 14. The pinion gear 13 is held against endwise movement by fitting into an annular recess 15 formed in the base 1. A segmental gear 16 is mounted on a pin shaft 17 journaled in bearings formed in the base 1. A handle-arm 18 is secured to the lower end of the pin shaft 17. A spring 19 is provided for returning the handle arm 18 to the rearward position after the same has been actuated to revolve the impaling member 4.

In order to permit the impaling member 4 to remain stationary during the return of the handle 18 to the operating position, clutch means are provided between the boss formed on the pinion gear 13 and the impaling member 4, which clutch means preferably comprise the pins 14 having beveled points 21 which fit beveled recesses 22 formed in the boss of the impaling member 4. The pins 14 are mounted in bores 23 in which compression springs 24 are positioned to yieldably urge the pins 14 outward from the bores 23 and into the beveled recesses 22. When the handle 25, which is secured to the handle-arm 18, is actuated to rotate the pinion gear 16 to rotate the impaling member 4, the straight edge of the pin 14 will engage the straight edge of the recess 22 and drive the impaled member 4 around. When the handle is pushed back, the beveled face of the pin 14 will engage the beveled face of the recess 22 and the pin 14 will retract in the bore 23 and not cause the impaled member 4 to rotate.

Adjustable stops 26 and 27 are formed on the base 1 for limiting the actuation of the handle-arm 18 so that the impaled member 4 will be rotated 360° only so that the impaling member 4 will at all times be aligned in position for impaling the fruit. Ears 28 are formed on the base 1 for securing the peach pitter to the surface of a table or the like. A fruit holder member 29 is provided having means for yieldably holding the same, either in position to engage the fruit or in position of not engaging the fruit, which means preferably comprise a pin 30 mounted on the supporting arm 31 for the fruit holder member 29, and which arm 31 is pivotally supported at a pin 32 mounted in ears 33 formed on the impaling member 4. A flat steel spring 35 is provided, which is secured to the upright 2 and extends upwardly from the plane of the impaling member 4 to engage the pin 30 and spring 35 being so positioned as to hold the fruit holder member 29 either in the engaging or non-engaging position, depending upon which side of the center of the pin 32 the pin 30 is rotated.

The impaler member 4 comprises upper and lower blades 36 and 37 which have upward cutting edges 38 and 39 and adjacent cutting edges 40, the cutting edges 40 terminating in the cut-a-way portions of the impaler blades 36 and 37 to provide the pit receiving recess 7. The blades 36 and 37 are secured together at their rear edge as indicated at 41 and are made replaceable so that the same may be removed when it is desired to change the pit receiving recess 7 in order to accommodate fruit having various sizes of pits. For this purpose, the cover-plate 3 may be easily removed from the upright 2 by removing the stud-bolts 42. The impaler blades 36 and 37 are slightly tapered throughout their length from the upward sharp edges 38 and 39 to the rear thereof so as to slightly spread the edge of the peach during the impaling operation so as to accommodate the pitting knife 8.

The modified form of this invention, illustrated in Figures 6, 7 and 8, is similar to the modification of this invention above described with the exception that the shaft $5^a$, upon which the impaler member $4^a$ is journaled, is at its opposite end secured to pinion gears $43^a$ which mesh with segmental gears $44^a$ which are secured to the shaft $17^a$ to which shaft $17^a$ the handle-arms $18^a$ and handle $25^a$ are secured. The stops $26^a$ and $27^a$ are moved closer together so that the impaling member $4^a$ is rotated through 180° while the pitting knife $8^a$ is rotated through 180° in the opposite direction. The segmental gears $43^a$ being of the internal type so that the pitting knife $8^a$ is rotated in a direction the reverse of that through which the impaling member $4^a$ is rotated. The pinion gear $13^a$ in this modification of the invention is not provided with clutch means for engagement with the impaling member $4^a$ but is directly connected to the impaling means $4^a$ by any suitable means, such as the pins $45^a$.

Having fully described my invention, it is to be understood that I do not wish to be limited to the exact constructions herein set forth which may obviously be varied without departing from the spirit of my invention as set forth in the appended claims.

I claim:

1. In a fruit pitter, the combination of an impaling blade upon which the fruit is adapted to be impaled, pitting means operably connected with the impaling blade and adapted to pass into the incision formed in the fruit during the impaling operation, and means for rotating the impaling blade relative to the said pitting means to sever the fruit from the pit.

2. In a fruit pitter, the combination of a bifurcated impaling blade, a curved pitting knife mounted within the said bifurcation of the impaling blade, and means for rotating the impaling blade relative to the said knife to sever the fruit from the pit.

3. In a fruit pitter, the combination of a bifurcated impaling member, curved pitting means axially mounted within the bifurcation, and means for rotating the impaling blade relative to the said pitting means to sever the pulp from the pit.

4. In a fruit pitter, the combination of a bifurcated impaling member, a curved pitting knife axially mounted within the said bifurcations, means for rotating the said impaling blade relative to the said axial pitting knife to sever the pulp from the pit, and means for limiting the rotation of the said impaling blade.

5. In a fruit pitter, the combination of a bifurcated impaling member, a shaft around which the said impaling member rotates, the said shaft extending through the bifurcation and being formed therein to provide pitting means, and means for rotating the said impaling member.

6. In a fruit pitter, the combination of a frame casting, an impaling member, a shaft supported by said frame casting around which the said impaling member rotates, a pit receiving recess formed in the said impaling member in which the said shaft is axially mounted and formed to provide a pitting knife, and means for rotating the said impaling member.

7. In a fruit pitter, the combination of a frame casting, an impaling member journaled in the said casting, a shaft supported by the said frame casting around which the said impaling member rotates, a pit receiving recess formed in the said impaling member and formed to receive a pitting knife, and means for rotating the said impaling member.

8. In a fruit pitter, the combination of a bifurcated impaling member, a shaft around which the said impaling member rotates, a curved pitting knife mounted within the bifurcation, and means for rotating the said impaling member in one direction and the pitting knife in the opposite direction.

9. In a fruit pitter, the combination of a bifurcated impaling member providing a pit receiving recess, a shaft around which the said impaling member rotates, extending into the said recess and formed to provide an axial mounted curved pitting knife, and means for rotating the said impaling member and pitting knife in opposite directions.

10. In a fruit pitter, the combination of a bifurcated impaling member providing a pit receiving recess, a shaft around which the said impaling member rotates, a curved pitting knife supported axially in the said recess, a pinion gear secured to the said impaling member, a segmental gear mounted in position to engage the said pinion gear, and means for rotating the said segmental gear.

11. In a fruit pitter, the combination of a bifurcated impaling member providing a pit receiving recess, a shaft around which the said impaling means rotates and which shaft extends into the said recess and is formed to provide a curved pitting knife, a pinion journaled on the said shaft, clutch means interposed between the pinion gear and the said impaling means, and means for rotating the said pinion gear.

12. In a fruit pitter, the combination of a bifurcated impaling member providing a pit receiving recess, a shaft around which the said impaling member rotates, and which shaft extends into the said recess and is secured to and supports a curved pitting knife axially in the said recess, a pinion gear secured to the said shaft, a pinion gear journaled on the said shaft and secured to the said impaling means, and means for rotating the said pinion gears in opposite directions.

13. In a fruit pitter, the combination of a frame, a bifurcated impaling member providing a pit-receiving recess, a shaft journaled in bearings at its opposite ends in the frame and around which the impaling member rotates, the shaft extending into the recess, a curved pitting knife secured to the shaft in the recess, a pinion gear secured to the shaft, a pinion gear journaled on said shaft and secured to the impaling means, and means for rotating the pinion gears in opposed directions.

14. In a fruit pitter, the combination of a frame, an impaling blade, means for rotatably supporting the impaling blade in the frame, pitting means, and means for rotating the impaling blade relative to the pitting means to sever the fruit from the pit.

15. In a fruit pitter, the combination of a frame, a bifurcated impaling blade, means for rotatably supporting the impaling blade within the frame, a curved pitting knife, and means for rotating the impaling blade relative to the curved pitting knife to sever the fruit from the pit.

16. In a fruit pitter, the combination of a frame, a bifurcated impaling member, curved pitting means axially mounted in the bifurcation, means for rotatably supporting the bifurcated impaling member within the frame, and means for rotating the impaling blade relative to the pitting means to sever the fruit from the pit.

17. In a fruit pitter, the combination of a frame of substantially U-shape, a bifurcated impaling member, means for rotatably supporting the bifurcated impaling member within the frame, a curved pitting knife axially mounted in the bifurcation, means for rotating the impaling blade in the frame relative to the pitting knife to sever the fruit from the pit, and means for limiting the rotation of the impaling blade.

18. In a device of the class described, the combination of a frame, a bifurcated impaling member, means for rotatably supporting the bifurcated impaling member in the frame, said means including a shaft extending through the bifurcation and being formed therein to provide pitting means, and means for rotating the impaling member within the frame.

Signed at Los Angeles, Calif., this 27 day of January, 1926.

EARL R. ANDERSON.